Jan. 1, 1924
P. W. FLEISCHER
SAFETY COUPLING
Filed Jan. 26, 1921
1,479,706
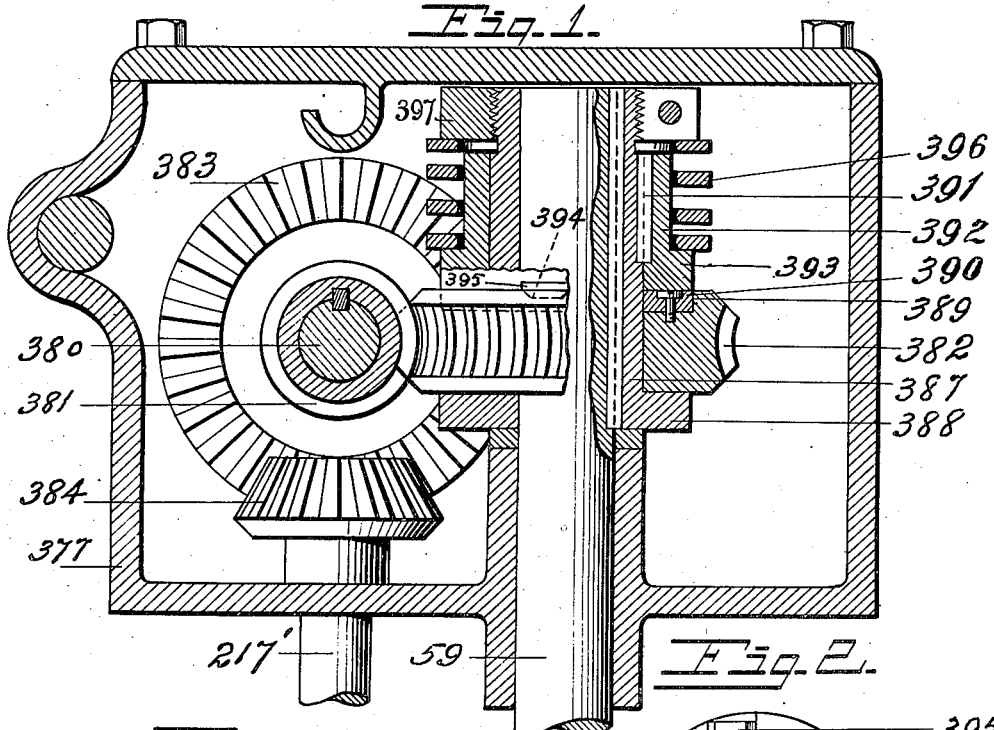
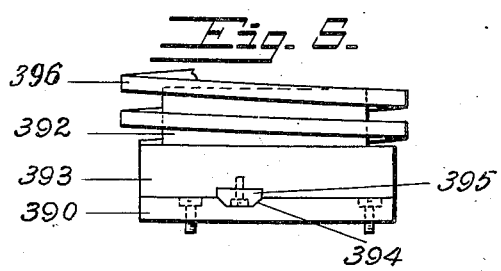
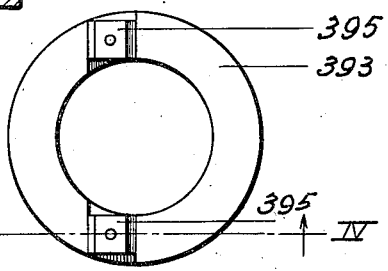
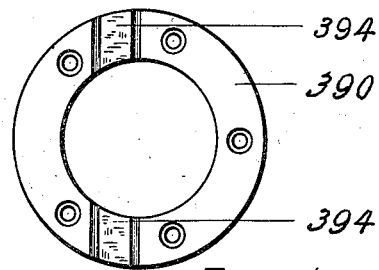
Inventor
Paul W. Fleischer.
By:
H N Low
Attorney.

Patented Jan. 1, 1924.

1,479,706

UNITED STATES PATENT OFFICE.

PAUL W. FLEISCHER, OF WEEHAWKEN HEIGHTS, NEW JERSEY, ASSIGNOR TO AMERICAN CAN COMPANY, OF NEW YORK, N. Y., A CORPORATION OF NEW JERSEY.

SAFETY COUPLING.

Original application filed December 6, 1915, Serial No. 65,266. Divided and this application filed January 26, 1921. Serial No. 440,009.

*To all whom it may concern:*

Be it known that I, PAUL W. FLEISCHER, a citizen of the United States, residing at Weehawken Heights, in the county of Hudson and State of New Jersey, have invented certain new and useful Improvements in Safety Couplings, of which the following is a specification.

The invention relates to a safety coupling, which may be in the nature of a shaft coupling or clutch, designed for the mutual connection of driving and driven power elements in such manner that when undue strain is encountered by and imposed upon the driven element the coupling will release itself and the driving element will become disconnected from the driven element, whereby the mechanical instrumentalities operated by the driven element will become safe from breakage, misshapement and disorganization.

My safety coupling, herein described and claimed, was disclosed in my application Serial No. 65,266 for can closing machines, filed December 6, 1915, wherein it was claimed as an element of a can closing mechanism. This present application is a divison of said former application and claims said safety coupling per se, as a mechanical appliance for use in any kind of machinery for which it is adapted.

It is desired to drive many machines with high power and at compartively high speed and from various causes the driven elements of the machines may become jammed and the machine stopped against the full power of the prime motor. The result of this is or may be quite serious, requiring the manufacturing operation to be suspended, with loss of time or material, until a broken or injured part of the mechanism can be replaced or repaired. According to the present improvement there is provided, at a suitable point in the train of driving elements, a yielding or friction driver or coupling which overcomes all of the resistance due to the ordinary and designed operations of the machine, but which will yield in the case of unusual obstruction or resistance and allow the said mechanisms to come safely to rest, while the prime motor and main power shaft or element of the machine driven thereby, may continue to operate until the power is thrown off or cut out. Thereupon the removal of any jammed material or article can be accomplished, the readjustment of the machine perfected if necessary, and the manufacturing operation continued without further delay.

With such objects in view, as well, as the attainment of all other features of usefulness and advantage which are inherent in the improved safety coupling, the invention consists in the parts and combinations thereof hereinafter set forth and claimed.

In order to make the invention more clearly understood there are shown in the accompanying drawings means for carrying the same into practical effect, without limiting the improvements, in their useful applications, to the particular construction which, for the purpose of explanation, has been made the subject of illustration. In the said drawings:—

Fig. 1 is a vertical sectional view illustrating driving and driven mechanism comprising and coupled by means of my improvement.

Fig. 2 is a bottom plan view of one of the coupling elements.

Fig. 3 is a top plan view of the corresponding coupling element.

Fig. 4 is a vertical sectional view on line IV—IV of Fig. 2.

Fig. 5 is a side view of the coupling elements with some adjacent parts.

Referring to the drawings, in which I have shown only a portion of a machine sufficient for the understanding of my invention, 377 is a gear casing, shown in this instance as located at or near the top part of the machine. In this casing is arranged and mounted a horizontal power shaft 380 which may be understood as actuated by any suitable prime motor. This shaft has keyed thereto and within the casing 377 a worm 381 which meshes with and drives a worm gear 382 mounted near the top of the vertical driving shaft 59. The shaft 59 may be considered as being the operating element of the working parts of the machine (not shown) which are to be made safe from injury. The beveled gear 383, beveled pinion 384, and shaft 217' cannot be rendered independent of their driving elements, which may be often desired, and they are operated more directly from the power shaft and not through the medium of the safety coupling.

In order that there may be no danger of breakage or damage of any of the numerous parts which may be operated by the cam shaft 59, because of anything becoming jammed in their mechanism, there is provided at the upper extremity of the vertical drive shaft 59 a yieldable friction driving safety slip or latch device, which will give if anything should arrest the proper operation of the machine.

The worm gear 382 is rotatably mounted upon a sleeve 387 keyed to the vertical cam shaft 59. The lower end of this sleeve is provided with an annular collar 388 upon which the worm gear 382 rests. In the upper face of the worm gear is an annular depression 389 in which is secured a case hardened steel latch ring 390. Above the worm gear and vertically slidably mounted upon the sleeve 387 by means of a feather key 391 is an outer sleeve or latch hub 392. This latch hub is also provided at its lower end with an annular surface 393 which bears upon the ring 390 in the worm gear 382. The ring 390 is provided in its upper face with two beveled notches 394 located off center or non-diametrically and adapted to receive and normally retain two case hardened steel beveled latches 395 (Fig. 2) secured in recesses designed to receive the same in the lower face of the collar 393 of the hub 392. Bearing upon the upper face of the collar 393 is a compression spring 396 which is adjustably held under tension by a lock nut 397 threaded onto the upper end of the inner sleeve 387. The tension of the spring is made sufficient to hold the blocks in the notches for the transmission of power under ordinary conditions. But if any extraordinary tension is caused by something jammed in the mechanism driven by the shaft 59, the worm gear 382 will continue to rotate but will force the beveled blocks 395 up against the pressure of the spring and out of engagement with the notches 394. The blocks 395 will then rest upon the smooth surface of the ring 390 as it rotates until the notches 394 make a complete revolution and again register with the blocks 395, and, if the obstruction is still in the machine, will again force the blocks out of engagement without rotating the drive shaft 59. This will continue until the obstruction or undue tension is removed, and then when the notches and blocks again register they will clutch and rotate as a unit. The tension required to operate the machine under normal conditions is regulated by the nut 397 on the inner sleeve 387, which may be loosened or tightened to lessen or increase the pressure of the spring.

The two beveled blocks 395 and the corresponding notches 394 are located off the diametrical center line. This particular construction is desirable to insure a complete revolution of the worm gear 382 before they can again engage. Were it not for this they would interclutch when they had made but one half of a revolution with increased number of shocks, and might throw the various mechanisms out of time. For example, if the wheel 382 did not make a complete revolution before recoupling, the mechanisms driven respectively by the shafts 217' and 59 would be out of time with respect to each other when the shaft 59 would be recoupled with the power and its driving functions would be resumed.

It will be observed from the foregoing, that my improvement does not consist merely in automatically-releasing coupling and clutch elements, but in such elements so constructed and arranged that they are on both sides of, or on a nearly diametrical line relative to, the center of rotation; furthermore this line is sufficiently nondiametrical to prevent any reengagement of the coupling parts at the end of a half-revolution and to permit recoupling when at the end of a complete revolution, with preservation of the proper timing of the parts which are driven respectively by the shaft 217' and the shaft 59.

My improvement gives to the power coupling device a wide bearing extending on both sides of the center of rotation, which is important for strength and also for proper disengagement and re-engagement, and also for purposes of economical manufacture, and I also obtain the essential result of preserving the proper related timing of various branches of the operating mechanism, of those which are driven through and by means of the power coupling and of those which are driven independently of said coupling.

The subject of the present application was also disclosed in my original application Serial No. 64,494, filed December 1, 1915, of which my said application Serial No. 65,266 was a division; but is not claimed therein.

It will be understood that the annular surface or collar 393 may be the integral bottom flange of the latch hub 392, or it may be a ring attached to the latch hub in a manner similar to the attachment of the latch ring 390.

I claim:

1. In a safety coupling, the combination of a rotary driving member, a rotary driven member, coupling elements on said members respectively and arranged at each side of the axis of rotation, so that there is a driving engagement at each side of the axis, and on a non-diametrical line, said elements being tapered and automatically disengageable by excess of resistance of the driven member, and a spring acting to press said couping elements into coupling engagement with each other.

2. In a safety coupling, the combination of a rotary driving member, a rotary driven member, coupling elements fixed on said members respectively at each side of the axis of rotation and out of line therewith, and a spring acting to press said coupling elements into coupling engagement with each other, whereby said coupling elements when disengaged are kept out of coupling engagement during one complete revolution of the driving member and then reengaged by the action of the spring.

3. In a safety coupling, the combination of a rotary driving member, a rotary driven member, coupling elements on said members respectively and arranged at each side of the axis of rotation and on the chord of a circle around said axis, said elements being tapered and automatically disengageable by excess of resistance of the driven member, and a spring acting to press said coupling elements into coupling engagement with each other.

4. In a safety coupling, the combination of a rotary driving member, a rotary driven member, coupling elements on said members respectively and arranged at each side of the axis of rotation and on the chord of a circle around said axis, said elements being tapered and automatically disengageable by excess of resistance of the driven member, and a spring acting to press said coupling elements into coupling engagement with each other, one of said rotary members being a sleeve and the other of said rotary members being a wheel, both arranged on said axis of rotation.

5. In a safety coupling, the combination of a rotary driving member, a rotary driven member, coupling elements on said members respectively and arranged at each side of the axis of rotation and on the chord of a circle around said axis, said elements being tapered and automatically disengageable by excess of resistance of the driven member, and a spring acting to press said coupling elements into coupling engagement with each other, the engaging surfaces of said coupling elements being parallel with said chord.

6. In a safety coupling, the combination of a shaft, a sleeve fixed to turn with said shaft, a gear wheel mounted loosely on said sleeve, an outer sleeve having means whereby it is caused to turn with the first sleeve and is longitudinally slidable thereon, a spring for forcing said outer sleeve yieldingly toward said gear wheel, means for increasing or decreasing the tension of said spring, and mutually engaging and automatically releasable safety coupling elements, a part of said elements being fixed on said outer sleeve and a part of said coupling elements being fixed on said gear wheel, said coupling elements being arranged on a non-diametrical chord of a circle of rotation of said shaft and wheel.

7. In a safety coupling which disengages under abnormal strain and automatically re-engages after on revolution, the combination of rotary driving and driven elements, one of which is provided with a plurality of recesses and the other of which is provided with a plurality of latches, said elements retaining the recesses and latches from movement due to centrifugal force, said recesses and latches being constructed and arranged to disengage under abnormal rotary strain, and each latch being re-engageable only with its own recess from which it disengaged.

In testimony whereof I affix my signature.

PAUL W. FLEISCHER.